United States Patent [19]
Lawson

[11] 4,166,000
[45] Aug. 28, 1979

[54] APPARATUS FOR WINDING HELICAL REINFORCEMENT INTO A POLYMERIC TUBE

[75] Inventor: Neil Lawson, Penarth, Wales

[73] Assignee: Dunlop Limited, United Kingdom

[21] Appl. No.: 870,013

[22] Filed: Jan. 16, 1978

Related U.S. Application Data

[63] Continuation of Ser. No. 635,937, Nov. 28, 1975, abandoned.

[30] Foreign Application Priority Data

Nov. 27, 1974 [GB] United Kingdom ............... 51305/74
Aug. 2, 1975 [GB] United Kingdom ............... 32389/75

[51] Int. Cl.² .......................................... B65H 81/00
[52] U.S. Cl. .................................. 156/425; 156/137; 156/143; 156/172; 156/494; 242/7.02; 242/147 R
[58] Field of Search ............... 156/137, 140, 143, 171, 156/172, 161, 162, 425, 426, 427, 429, 392, 446, 447, 177, 298, 494; 242/7.02, 7.21, 7.22, 7.23, 47.09, 158 R, 147 R, 153, 155 R; 226/195; 74/232, 233, 237, 238

[56] References Cited

U.S. PATENT DOCUMENTS

| | | | |
|---|---|---|---|
| 2,627,378 | 2/1953 | Hirsh | 242/7.02 |
| 2,749,054 | 6/1956 | Crom, Jr. | 242/7.22 |
| 2,896,572 | 7/1959 | Burke | 242/47.09 |
| 3,122,341 | 2/1964 | LeBus, Sr. et al. | 242/157.1 |
| 3,154,451 | 10/1964 | MacDougall | 156/137 |
| 3,400,901 | 9/1968 | Parilla et al. | 242/158 R |

FOREIGN PATENT DOCUMENTS 602001 5/1948 United Kingdom .
686461 1/1953 United Kingdom .
800958 10/1961 United Kingdom .

*Primary Examiner*—Michael W. Ball
*Attorney, Agent, or Firm*—Stevens, Davis, Miller & Mosher

[57] ABSTRACT

Apparatus for winding a helical reinforcement into a polymeric tube comprising a mandrel on which the tube is assembled, a gauge mandrel portion at one end to feed reinforcement material a driven guide eye to give the required pitch to the winding and a constant-path-length compensating device to lead the reinforcement from the gauge portion to the guide eye.

7 Claims, 7 Drawing Figures

APPARATUS FOR WINDING HELICAL REINFORCEMENT INTO A POLYMERIC TUBE

This is a continuation of application Serial No. 635,937 filed Nov. 28, 1975, now abandoned.

This invention relates to reinforced polymeric articles and in particular to an apparatus winding a helical reinforcement member for a tubular, polymeric article and method of operating said apparatus.

In such articles the polymeric material is generally comparatively soft when the reinforcement is helically wound onto it and to avoid variable penetration of the polymeric material by the winding and produce a winding of constant diameter, it is necessary accurately to control the tension at which the reinforcement member is maintained as it is wound into place. Even this would not produce a constant diameter winding if the hardness of the polymeric material was variable. One known method of obtaining a constant diameter for the helical reinforcement member is accurately to control the rate of feed of the reinforcement member such that the rate of feed provides precisely the required length for the required helix diameter and pitch. This has been done by providing a counter-rotating screwed cylinder parallel to the mandrel on which the article is being formed, and having a diameter at the base of the screw the same as the base diameter of the reinforcement helix to be formed and a pitch the same as the required pitch. The reinforcement is then wound around a few turns of the screwed cylinder, and led onto the article, which is mounted on a mandrel. As the screwed cylinder is rotated it feeds the reinforcement member, on to the mandrel at the same pitch as the screw on the cylinder. This method requires firstly a screwed cylinder for each different helical reinforcement and secondly gear or chain drive means to produce a reinforcement in which adjacent turns are in contact (i.e., at touch pitch).

According to one aspect of the present invention an apparatus for winding a helical reinforcement layer for a filamentary reinforced, tubular, polymeric article comprises a mandrel, for carrying the polymeric article, the mandrel having an axially extending gauge portion at one end the diameter of which is determined by the required reinforcement winding diameter, a guide eye mounted adjacent to the mandrel, drive means for driving the guide eye along the mandrel to give the required pitch to the helical winding and a compensating mechanism to allow for the relative movement beteen the guide eye and the mandrel and to maintain the path length distance from the gauge portion to guide eye substantially constant such that in use the gauge portion of the mandrel feeds reinforcement material of the required length per turn from the compensating mechanism to the guide eye.

Preferably the compensating device comprises a constant length guide for the reinforcement winding material. The constant length guide may comprise two or more rigid link members pivotally connected end-to-end with one end connected to the guide eye and the other end fixed in relation to the gauge portion of the mandrel such that the reinforcement material when guided along the links follows a constant path length to the guide eye. Alternatively, the constant length guide may comprise a flexible link member. The link members are preferably tubular and the reinforcement material is passed through the tubular link member or members.

In one preferred apparatus two rigid links are used inter-connected by a clevis joint to form a bipod structure which is anchored adjacent to the gauge portion and connected to the guide eye by means of further clevis joints, each of which is mounted on a vertical rotatable spindle.

In another arrangement the compensating device may comprise a guide pulley freely mounted on an axle for rotation and axial sliding thereon and the rotational axis of the axle is arranged at an angle to the axis of the mandrel such that in use the gauge portion of the mandrel feeds reinforcement material of the required length per turn and the reinforcement material is passed over the guide pulley and led onto the mandrel by means of the guide eye, the guide pulley sliding upon its axle to maintain substantially constant during winding the length of reinforcement between the gauge portion and the guide eye.

Preferably a spacer device is mounted parallel to the gauge portion and the reinforcement material is passed around the spacer device as well as the gauge portion the spacer device thus maintaining a constant spacing of the turns of the reinforcement material around the gauge portion. Typically four or five turns around the gauge portion and spacer device are used.

The guide eye may be moved along the mandrel at a speed either to provide spaced-apart reinforcement windings or to contacting reinforcement windings (i.e., at touch pitch).

The gauge portion of the mandrel may be fixed or detachable from the mandrel and in the latter case different gauge portions can be fitted to the same mandrel for different reinforcements, e.g. different depths of penetration of a polymeric layer mounted on the mandrel.

A second guide eye is preferably provided to feed the reinforcement onto the gauge portion.

Another aspect of the invention provides a method of winding a helical reinforcement which comprises simultaneously rotating the gauge portion and a mandrel, the effective diameter of the gauge portion being equal to the diameter of the required mandrel winding layer, feeding the filamentary material from the gauge portion by means of a compensating mechanism to the mandrel without relative slippage, the compensating mechanism serving to maintain constant winding layer length transference from gauge portion to mandrel.

The present invention is particularly useful for the simultaneous manufacture of small precision drive belts in which the mandrel has teeth cut into it in the axial direction so that the polymeric material of the belt is forced into these teeth thus providing when divided circumferentially a number of belts with gear teeth on the inside circumference. In such application, particularly where high modulus filamentary material is used, such as glass fiber it is difficult to maintain a constant winding tension by conventional means. By means of the present invention precise manufacture is maintained by feeding precise lengths of filamentary material during helical winding of the belt reinforcement.

Further aspects of the invention will be apparent from the following description, by way of example, only, of two embodiments of the invention in conjunction with the accompanying diagrammatic drawings in which.

Figure 1:
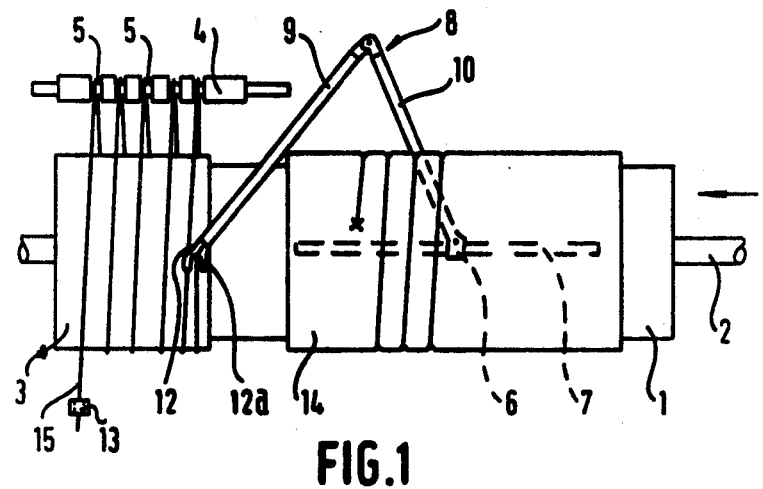
FIG. 1 is a side view of an apparatus for winding reinforcement.
Figure 2:
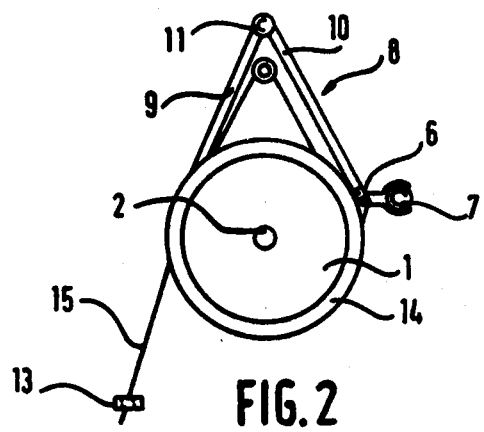
FIG. 2 is an end view from the right of the apparatus of FIG. 1.
Figure 3:
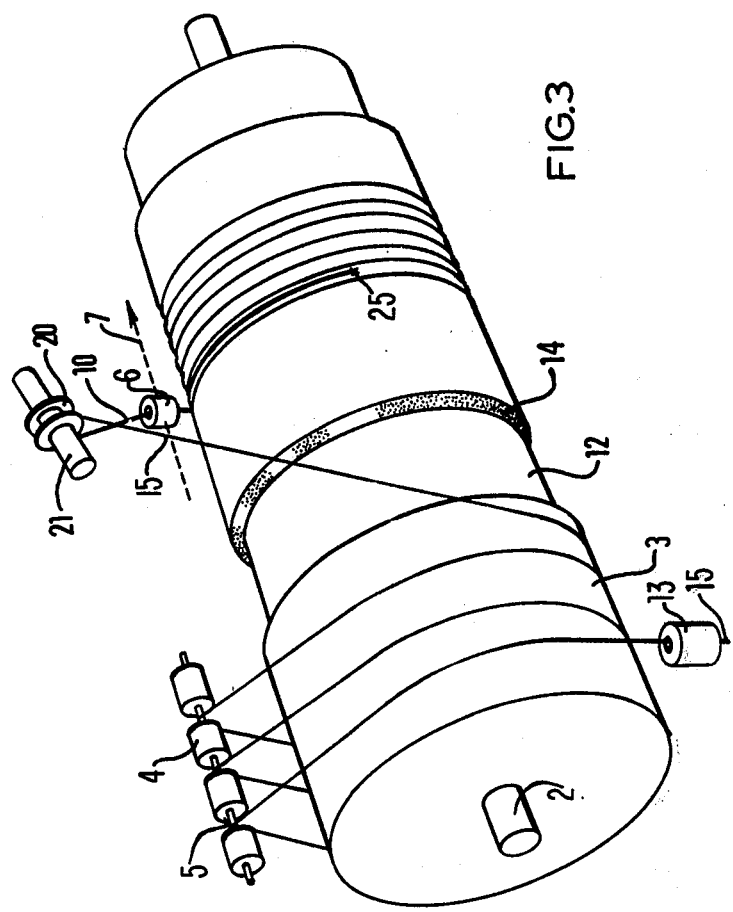
FIG. 3 is a diagrammatic perspective view of an apparatus according to the present invention.
Figure 4:
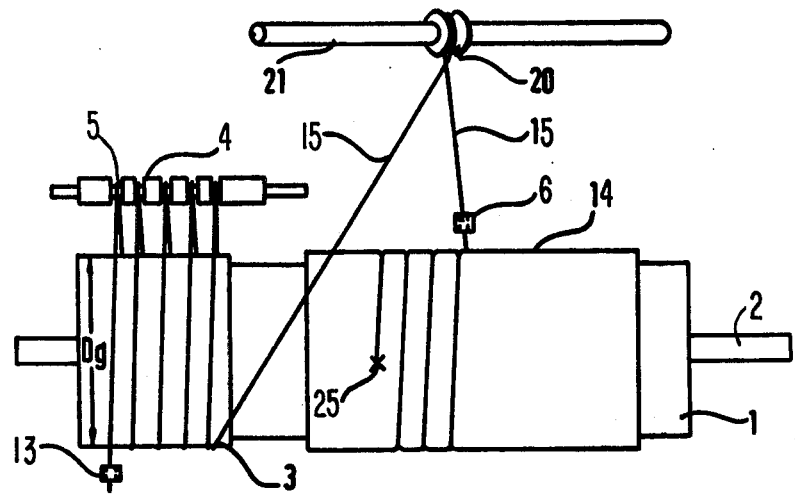
FIG. 4 is a side view of the apparatus, shown in FIG. 3.
Figure 5:
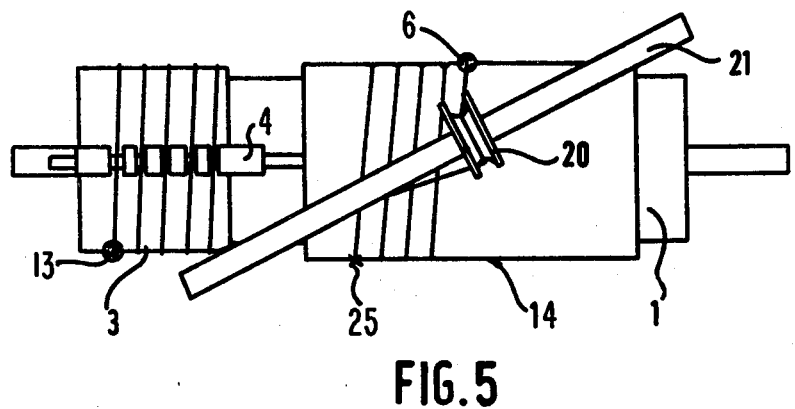
FIG. 5 is a top view of the apparatus shown in FIG. 3.
Figure 6:
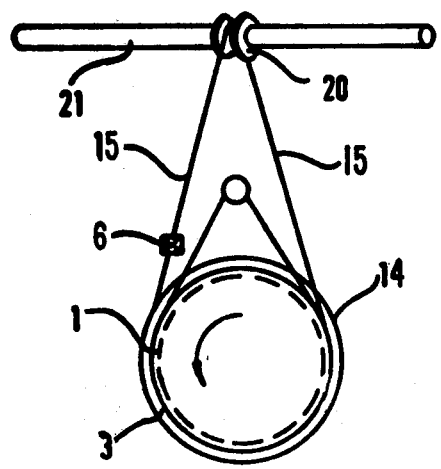
FIG. 6 is an end view of the apparatus shown in FIG. 3.

As shown in FIGS. 1 and 2 the belting is made by a cylindrical mandrel 1 mounted horizontally on a shaft 2 and having an end mounted gauge portion 3 which provides a constant speed feed device. Parallel to and just above the gauge portion 3 is mounted a spacer device 4 which comprises a shaft rotatably mounted on the frame (not shown) of the apparatus, the device is provided with a series of spaced circumferentially-extending grooves 5 for guiding the reinforcement material.

The major portion of the mandrel provides an assembly surface on which to assemble belting which comprises a long tubular cylindrical sleeve which when cut transversely after the sleeve has been cured provides a plurality of narrow belts. A guide eye 6 is provided adjacent to the mandrel 1 and is mounted on a lead screw 7 extending horizontally parallel to the mandrel which provides accurate gradual movement of the guide eye 6 along the mandrel 1. This movement is linked to the rotational movement of the mandrel 1 so that movement of the mandrel causes displacement of the guide eye a small way along the screw 7 thereby providing the required spacing between the helical winding of the reinforcement.

A compensating mechanism 8 is provided for leading the reinforcement material from the gauge portion 3 to the guide eye 6. The compensating mechanism comprises two rigid links 9 and 10 each comprising a steel tube. Rigid links 9 and 10 are interconnected by a clevis joint 11 having a small pulley on the clevis pin connecting the tubular members to guide the reinforcement material. The end of the rigid link 9 adjacent to the gauge portion is mounted on the bed of the frame (not shown) by means of a second clevis joint 12, which has its axis horizontal and attached to a short length of tube 12a having its axis vertical and which is rotatably mounted in the bed of the frame, the mounting being such that the tube 9 may rotate about the axis of the tube 12a and may pivot about the clevis joint axis. An aperture is provided through the clevis pin of the joint 12 through which the reinforcement material may be passed. The second link member 10 is connected to the guide eye, carried by a member running on the lead screw, by a third clevis joint and a pivotally mounted tube assembly so that the interconnected rigid links are able to hinge about the clevis joints and pivot and the tube 12a to maintain a tubular path from the gauge portion of the mandrel 3 to the guide eye 6 wherever the guide eye 6 is along the lead screw 7.

A second guide eye 13 is provided for feeding the reinforcement material onto the gauge portion of the mandrel 3.

The operation of the device is as follows. A layer of uncured polymeric material 14 is positioned on the mandrel 1. A reinforcing yarn of glass fiber 15 is led by the second guide eye 13 onto the gauge portion of the mandrel 3 and is passed around it and the spacer device 4 for five turns, each portion being positioned in a separate groove 5 of the spacer device 4. This encircling of the gauge portion provides a drive mechanism for the reinforcing yarn providing a fixed drive rate. The diameter of the gauge portion is chosen so that the fixed drive rate is precisely that required to form a reinforcement winding having the required dimensions.

The reinforcement material 15 is taken from the gauge portion of the mandrel 3 at the joint 12 and is passed through the clevis pin aperture and through the tubular links 9 and 10 to the guide eye 6 from where it is wound onto the layer of the polymeric material. The guide eye 6 is progressed along the mandrel 1 by the member running on the lead screw to give the required spacing of the helically wound reinforcement material. As the reinforcement material is taken from the guage portion the links 9 and 10 ensure a constant path length of reinforcement by pivoting where the links are joined thereby increasing or decreasing the distance between the joint 12 and the guide eye 6 while maintaining constant the length of reinforcement.

It will be understood that the compensating device need not be tubular and could comprise rigid links with yarn guides attached to the outside so as to provide a constant path length. Alternatively the compensating device may comprise a flexible tube or several rigid links flexibly interconnected. An alternative device is shown in FIGS. 3 to 6 and utilizes the same mandrel 12 as in the first described apparatus having a similar lead screw (not shown). The compensating device, however, comprises a guide wheel 20, which has a deep groove around its circumference and is freely mounted for rotation upon and sliding along an axle 21. The axle 21 is mounted with its plane horizontal above and parallel to that of the mandrel. The axis of the axle 21 as well as lying in a plane parallel to the mandrel axis also lies in a plane which intersects a plane in which the axis of the mandrel lies so that, when viewed in plan (FIG. 5) the axes lie at an angle to one another.

The operation of the device is as follows. The reinforcement tension causes the guide pulley 20 to freely rotate and to slide along the axle 21. Due to the angular position of the axle 21, in one example 17°, the sum of the length of yarn 9 between the guide pulley 13 and the pulley 21 and the length of yarn 10 between the pulley 21 and the guide eye 5 is kept substantially constant. This causes the reinforcement to be applied at constant winding length per mandrel rotation along the full length of the mandrel 12 the pulley 20 moving up and down the shaft 21 as required. The lead screw (not shown) ensures that the reinforcement is applied at the required pitch as in the first embodiment. Before winding is commenced the reinforcement material is engaged upon a fixed location 25 so that the end of the reinforcement material is held in place securely.

Typical dimensions for making small belts are as follows.

Length of the assembly mandrel 25.0 to 35.0 cms; diameter of the assembly mandrel 4.8 cms; and movement of the guide pulley along the axle 6 is 4½, 11.5 cms.

While the dimensions of the machine are not critical to the invention the present apparatus is thought particularly advantageous for belts having a width of up to 60 cms and a diameter of 2.5 to 15 cms. A 60 cms long mandrel allows simultaneous manufacture of a large number of small belts.

Various diameter gauge portions can be provided for attachment to a particular mandrel so that belts having different diameter reinforcements may be produced from a single mandrel. The gauge diameter is always made greater than the mandrel by an amount which is equivalent to the thickness of a layer of polymeric material which it is required to have under the reinforcement.

The present invention allows manufacture of sleeving having a great variety of reinforcement winding spacings including reinforcements in which the adjacent turns of the reinforcement are in contact (i.e., at touch pitch).

The apparatus may be used for articles other than belting e.g. hoses and other reinforced sleeving but it is particularly applicable to small belts in which extreme accuracy of positioning of reinforcement and constant tension of the reinforcement winding are essential to provide a belt which runs true and smoothly when in use.

Having now described my invention—what I claim is:

1. In an apparatus for winding a helical reinforcement layer for a filamentary reinforced, tubular, polymeric article having:
   (a) a mandrel for carrying the polymeric article;
   (b) the mandrel having an axially extending substantially smooth unthreaded gauge portion at one end having a diameter determined by the reinforcement winding diameter;
   (c) a guide eye mounted adjacent to the mandrel and drive means for driving the guide eye along the mandrel to give the required pitch to the helical winding; the improvement comprising:
   (d) means to feed reinforcement material at a substantially constant winding length per mandrel rotation, said means including a compensating mechanism comprising a constant length guide having at least two rigid link members pivotally connected end to end to form the guide, one end of which is connected to the guide eye and the other end being fixed in relation to the gauge portion of the mandrel so as to allow for relative movement between the guide eye and mandrel and to maintain the path length distance from the gauge portion to the guide eye substantially constant such that in use the gauge portion of the mandrel feeds reinforcement material at a substantially constant winding length per mandrel rotation from the compensating mechanism to the guide eye.

2. Apparatus according to claim 1 wherein the link members are tubular so that reinforcement material may be passed through said members.

3. Apparatus according to claim 1 in which the link members are tubular, a clevis joint interconnecting said members, a clevis joint at the opposite ends of each said member connecting said opposite ends to the guide eye and to a fixed portion of the mandrel, each of the latter clevis joints being mounted on a vertical rotatable spindle.

4. Apparatus according to claim 3 wherein apertures are provided through the axis of each clevis joint through which the reinforcement material may be passed.

5. Apparatus according to claim 1 including a spacer device mounted parallel to the base portion of the mandrel and positioned so that the reinforcement material may be passed around the spacer device and the gauge portion of the mandrel so that the spacer device determines the spacing of the turns of the reinforcement material.

6. Apparatus according to claim 5 wherein the spacer device comprises a cylindrical rod with equally spaced circumferential grooves.

7. In an apparatus for winding a helical reinforcement layer for a filamentary reinforced, tubular, polymeric article having:
   (a) a mandrel for carrying the polymeric article;
   (b) the mandrel having an axially extending substantially smooth unthreaded gauge portion at one end having a diameter determined by the required reinforcement winding diameter;
   (c) a guide eye mounted adjacent to the mandrel and drive means for driving the guide eye along the mandrel to give the required pitch to the helical winding; the improvement comprising:
   (d) means to feed reinforcement material at a substantially constant winding length per mandrel rotation, said means including a compensating means to allow for relative movement between the guide eye and the mandrel and to maintain the path length distance from the gauge portion to the guide eye substantially constant such that in use the gauge portion of the mandrel feeds reinforcement material at a substantially constant winding length per mandrel rotation from the compensating mechanism to the guide eye, said compensating means comprising a guide pulley freely mounted on an axle for rotation and axial sliding thereon with the axis of the axle being arranged at an angle to the axis of the mandrel when viewed in plan and parallel thereto when viewed in elevation.

* * * * *